A. C. EASTWOOD.
SYSTEM OF CONTROL FOR ELECTRIC MOTORS.
APPLICATION FILED MAY 9, 1908.
904,765.  Patented Nov. 24, 1908.
3 SHEETS—SHEET 1.
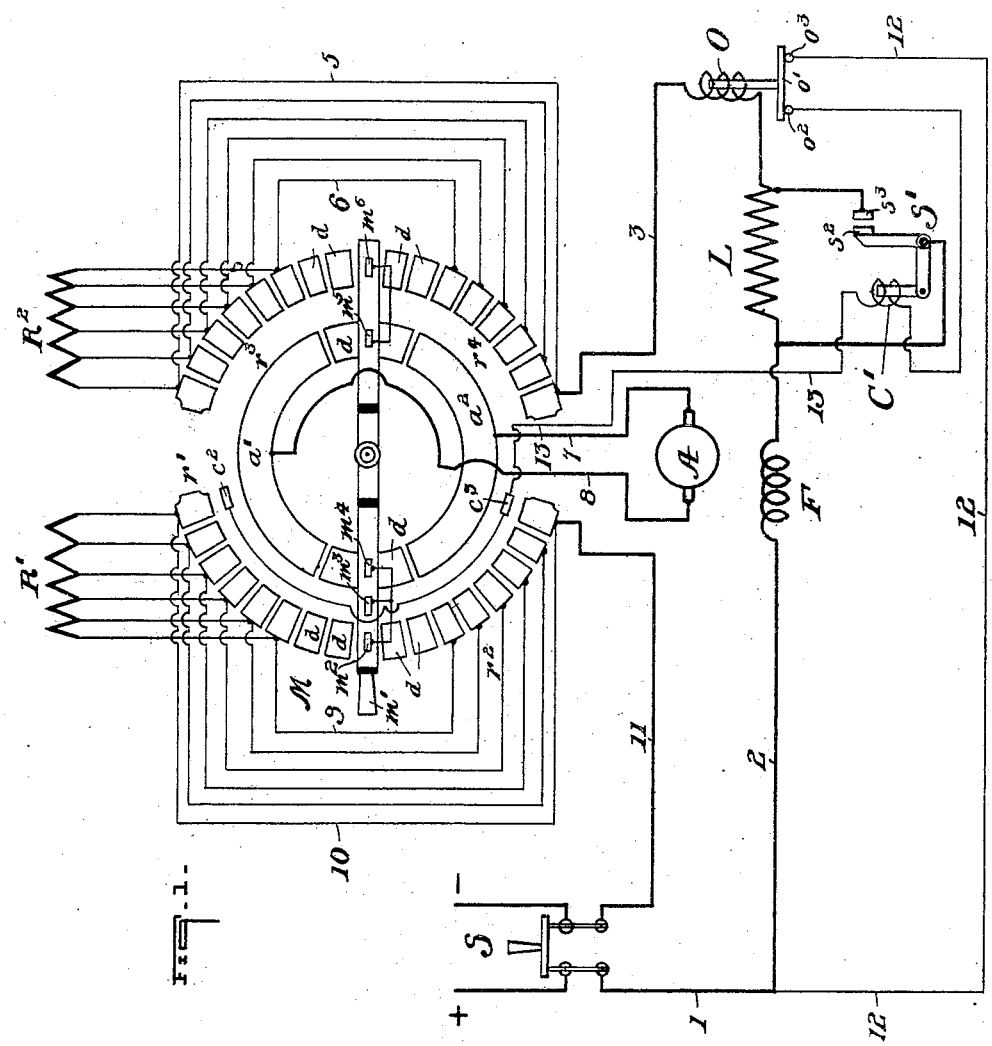
WITNESSES:
INVENTOR
A. C. Eastwood
by F. N. Barber
ATTORNEY

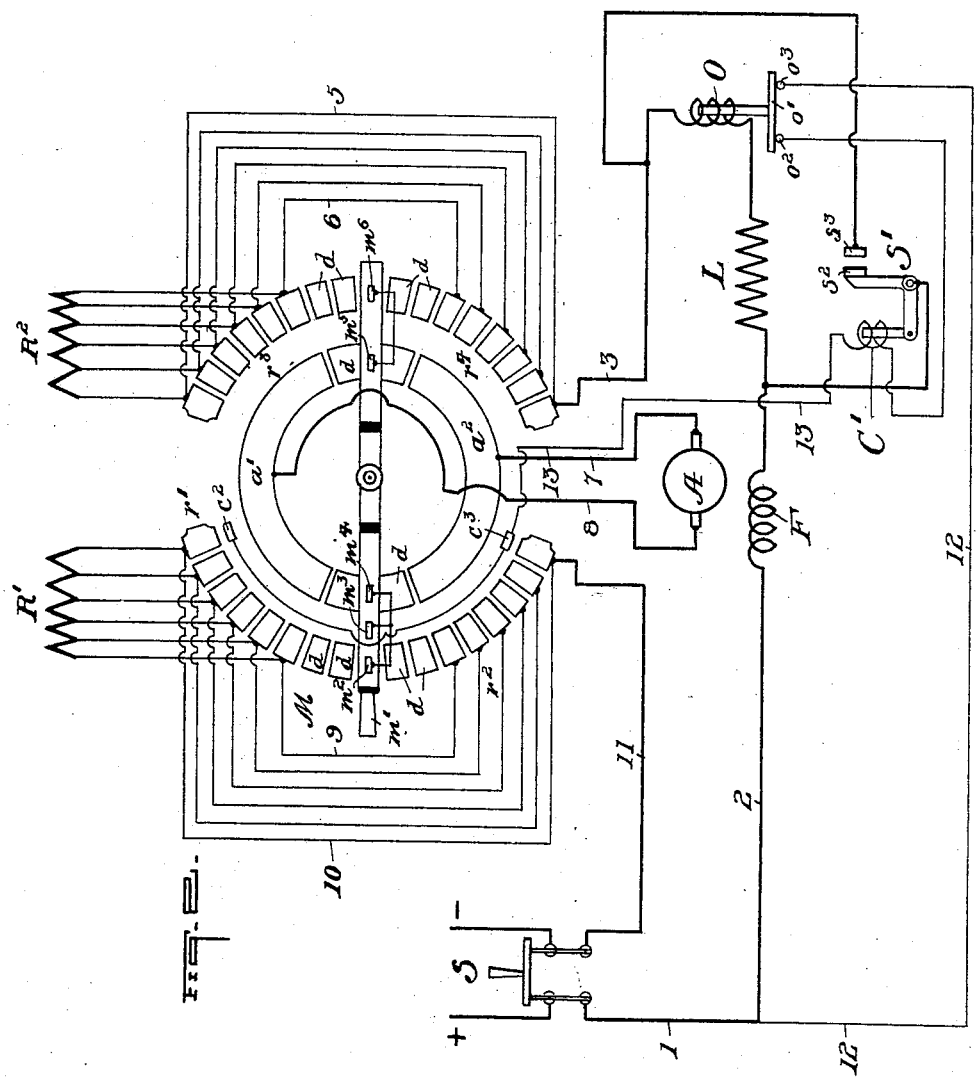

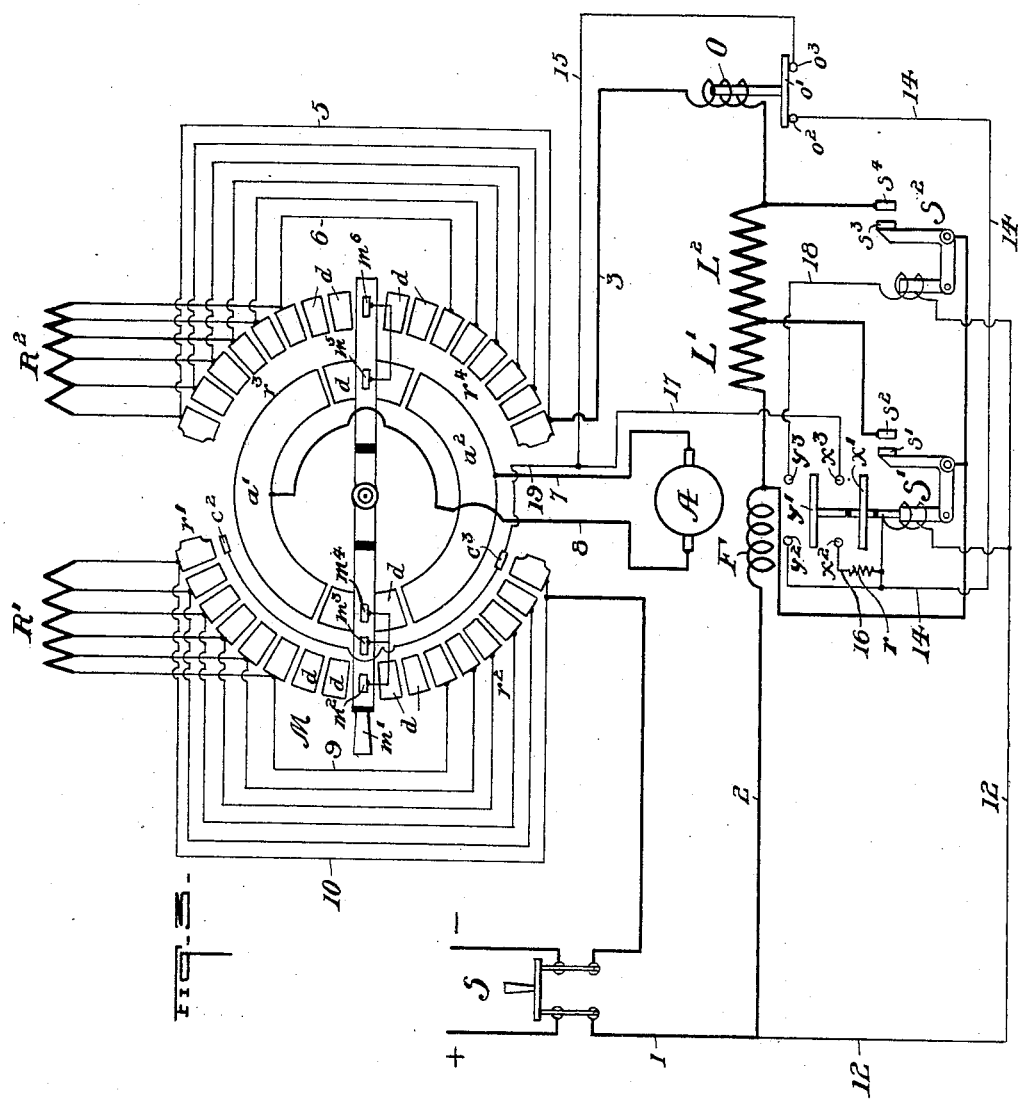

UNITED STATES PATENT OFFICE.

ARTHUR C. EASTWOOD, OF CLEVELAND, OHIO.

SYSTEM OF CONTROL FOR ELECTRIC MOTORS.

No. 904,765.　　　　Specification of Letters Patent.　　　　Patented Nov. 24, 1908.

Application filed May 9, 1908. Serial No. 431,902.

*To all whom it may concern:*

Be it known that I, ARTHUR C. EASTWOOD, a citizen of the United States, residing at Cleveland, in the county of Cuyahoga and State of Ohio, have invented or discovered new and useful Improvements in Systems of Control for Electric Motors, of which the following is a specification.

My invention relates to an improved system of control for electric motors.

The objects of my invention are: To prevent excessive rush of current when a manually operated controller is advanced to the full-speed position very rapidly; to prevent injurious rush of current when an electric motor is suddenly reversed by means of a manually operated controller; to protect the motor governed by the controller from excessive overload without opening the circuit of the motor; to secure the above mentioned results with a controller which will be simple and relatively inexpensive.

When a manually operated controller is used to govern an electric motor, if the controlling resistance is cut out too rapidly by the operator, an excessive current will flow through the motor. If the motor is suddenly reversed, while running at full speed, a still greater excess of current is likely to result.

My invention embraces means for limiting the flow of current and thus guarding against the inexperience or carelessness of an operator when the controller is too rapidly advanced to the full-speed position or too suddenly reversed.

My invention also embraces means for automatically limiting the flow of current when the load becomes excessive, even after all of the resistance controlled by the manually operated controller has been removed from the motor circuit.

In carrying out my invention, I provide a manually operated controller by means of which a certain amount of resistance in the motor circuit may be varied at the will of the operator who may thereby control the speed of the motor between certain limits, and by means of which the direction of rotation of the movable member of the motor may be reversed, if reversal is required. In addition to the manually operated controller, I provide a supplementary bank of resistance in the motor circuit and one or more power-actuated switches for removing this resistance from or inserting it in the motor circuit. At or near the full-on position of the manually operated controller, I provide switch contacts and connections at which the energizing circuit of the power actuated switch or switches is normally open till the manually operated controller is advanced to, or nearly to, the full speed position. In addition to these switch contacts I provide a second set of switch contacts controlled by means responsive to the current flowing through the motor, preferably by a relay having its winding directly in series with the motor circuit. The relay will be so arranged and adjusted that if the current flowing through the motor exceeds a predetermined amount the contacts controlled by the relay will be separated, thereby holding the energizing circuit of the power-actuated switch or switches open; while if the current flowing in the motor circuit is less than a predetermined amount the contacts controlled by the relay will be in engagement. With this arrangement of parts, no matter how rapidly the resistance governed by the manually operated controller may be cut out the current will be limited by the supplementary or current-limiting resistance. The supplementary resistance may be proportioned to limit the current to, say, a 50% overload on the motor. The current controlled relay may be adjusted to prevent cutting out of the supplementary resistance by the power-actuated switch till the motor current has dropped to a full-load value. In cases where the character of the load is such that the supplementary resistance cannot be cut out as a unit by a single power-actuated switch the resistance will be divided into sections and controlled by two or more power-actuated switches, governed by the current-controlled relay.

My invention will be more fully understood by reference to the accompanying drawings in which—

Figure 1 is a diagram of electrical connections of one form of my invention; Fig. 2, a modification of Fig. 1; and Fig. 3, a second modification in which the supplementary resistance is divided into two sections and two magnetically operated switches are provided to control the resistance.

In Fig. 1, M is a manually operated controller of the well known "dial" or "faceplate" type. R' and R² are resistances under the control of the controller M. The resistances are divided into sections connected to the contact segments in the groups $r'$ and $r^2$, $r^3$ and $r^4$. The contact segments in the group $r'$ are electrically connected to corresponding segments in the group $r^2$; and the segments in group $r^3$ are electrically connected to corresponding segments in the group $r^4$. $a'$ and $a^2$ are contact segments arranged concentrically with the outer groups $r'$, $r^2$, $r^3$, and $r^4$. $c^2$ and $c^3$ are additional short segments placed at or near the full-on position of the controller. $m'$ is the contact arm of the controller, pivoted at its middle point and provided at one end with contact-fingers or brushes $m^2$, $m^3$, and $m^4$, all electrically connected but insulated from the arm $m'$. The brush $m^2$ is adapted to coöperate with the segments in the group $r'$ or the group $r^2$, according to the direction in which the arm is moved from the off-position, in which it is shown. The brush $m^3$ is similarly adapted to engage with the segments $c^2$ or $c^3$, and the brush $m^4$ with the segments $a'$ or $a^2$. The other end of the arm $m$, is provided with brushes $m^5$ and $m^6$, the brush $m^5$ being adapted to coöperate with the segments $a'$ and $a^2$, and the brush $m^6$ with the groups of segments $r^3$ and $r^4$. $d$, $d$, $d$, $d$ are dead-blocks (having no electrical connections) upon which the brushes rest when the contact arm $m'$, is in the off-position. S is a switch connected to the source of current. A is the armature of the motor to be controlled and F is its series field winding. L is the supplementary or current-limiting resistance. S' is a magnetically operated switch, adapted when closed to short-circuit the resistance L. O is a current-controlled relay having contacts controlling the circuit of the actuating winding of the switch S'. The parts are indicated in the relations which they take when the controller M is in the off-position. If the operating lever $m'$ of the controller be moved in a clockwise direction till the brushes $m^2$ and $m^6$ make contact with the first live segments in the groups $r'$ and $r^4$ respectively, a circuit will be completed through the motor as follows: from the positive side of the switch S through the wires 1 and 2, the series field F, the supplementary resistance L, the winding of the relay O, the wire 3 and, the cross connection 5, through all of the resistance $R^2$, the cross-connection 6 to the first live segment in the group $r^4$, thence through the brush $m^6$ to the brush $m^5$, the segment $a^2$, the wire 7, the armature A, the wire 8, the segment $a'$, the brush $m^4$ to brush $m^2$, to the first live segment in the group $r'$, through the wire 9, all of the resistance $R'$, the connection 10, and the wire 11 to the negative side of the switch S, thus completing the circuit. In this position of the controller all of the resistances $R'$ and $R^2$ governed by the controller M, as well as the supplementary resistance L, is in series with the motor which will therefore operate at minimum speed. As the arm of the controller is moved further in a clockwise direction the sections of the resistances $R'$ and $R^2$ are consecutively cut-out in a well-known manner. No matter how rapidly the operator may move the arm $m'$ to cut-out the resistances $R'$ and $R^2$ the maximum flow of current is limited by the resistance L.

We will assume that the resistance L is so proportioned as to allow 150% of the full load current to flow under the worst conditions and that the operator has so operated the controller M that this value of current is reached when the arm $m'$ reaches the full-on position. We will assume also that the relay O is adjusted to raise the plunger and lift the contact member $o'$ from the contacts $o^2$ and $o^3$ when the current through its winding reaches a value corresponding to the full-load current of the motor. Under the conditions assumed the contacts of the relay O will be thus separated when the full-on position of the controller is reached. As the controller arm $m'$ reaches the full-on position, the brush $m^2$ makes contact with the segment $c^2$, which tends to complete a circuit through the winding C', of the switch S'. This circuit, however, cannot be completed while the contacts of the relay O are separated. When the current flowing through the motor has dropped to a proper value the plunger of the relay O will fall, thus causing the contact member $o'$ to connect the contacts $o^2$ and $o^3$. The circuit through the actuating winding of the switch S' is then completed as follows:—from the positive side of the switch S, through the wires 1 and 12, the contacts $o^3$ and $o'$ and $o^2$ of the relay O, the winding C' of the switch S', the wire 13 to contact $c^2$, through brushes $m^3$ and $m^2$, the cross-connection 10 and the wire 11 to the negative side of the switch S. This circuit energizes the winding C' causing it to draw in its plunger, thus closing the switch S' at its contacts $s^2$ and $s^3$. As will be readily seen this short-circuits the resistance L which permits the motor to come up to full speed. If, while the motor is running at full speed its load should increase beyond a normal amount the relay will raise its plunger, thus opening the circuit of the coil C' at the contacts $o'$, $o^2$ and $o^3$ and causing the switch S' to open, thus reinserting the resistance L in the motor circuit. When the overload has disappeared, the relay will again drop its plunger, causing the resistance L to be again automatically cut-out. When the arm $m'$ is moved toward the off-position the brush $m^3$ leaves contact with the segment $C^2$ causing the switch S' to open, thus placing the resistance L in the motor circuit. As the arm is moved further towards the off-position the resistances $R'$ and $R^2$ are reinserted in the motor circuit step by step. When the arm $m'$ is moved in a counter clockwise direction from the off-position the action of the apparatus will be as above described with the exception that current will flow through the armature A in a reversed direction, causing its direction of rotation to be reversed. If the motor be "plugged" by suddenly reversing the controller, the resistance L will be in circuit to prevent an excessive rush of current.

Fig. 2 is identical with Fig. 1 with the exception that the connections to the switch $S'$ are such that when the switch closes it short-circuits both the resistance L and the winding of the relay O. In this case the relay O becomes inoperative after the switch $S'$ has closed until the arm of the controller is again moved from the full-on position.

Fig. 3 differs from Fig. 1 in that the current-limiting resistance is divided into two sections $L'$ and $L^2$, and two magnetically operated switches $S'$ and $S^2$ are provided for controlling this resistance. The main or series connections between the manually operated controller M, the armature and field of the motor and the winding of the relay O are the same in either case. In Fig. 3 if the full-on position of the controller is reached, and an over-load does not exist, the circuit of the actuating winding of switch $S'$ will be completed as follows:—from the positive side of the switch S through the wires 1 and 12, the winding of the switch $S'$, the wire 14, the contacts $o^2$, $o'$, and $o^3$ of the relay O, the wires 15 and 17 to the contact $c^2$ or $c^3$ as the case may be, through the brushes $m^3$ and $m^2$ and the wires 10 and 11 to the negative side of switch S. This causes switch $S'$ to close, short-circuiting the section of the resistance $L'$. The plunger of the switch $S'$ carries two contact members $x'$ and $y'$ adapted to bridge respectively—contacts $x^2$, $x^3$, and $y^2$, $y^3$ when the switch is closed. The upper end of the winding of switch $S'$ is connected to contact $x^2$ through the resistance $r$, and contact $x^3$ is connected by wire 17 to wire 19 ahead of the contacts of the relay O. When switch $S'$ is once closed it therefore remains closed with the resistance in series with its winding as long as the arm of the controller is in the full-on position, irrespective of future action of the relay O. The resistance $r$ is so proportioned as to allow sufficient current to flow through the winding of the switch $S'$ to hold the switch closed but limits the current to a value below that required to close the switch $S^2$. The switch $S^2$ cannot close till the switch $S'$ has closed because the upper end of its winding is connected to wire 14 through the wire 18 and the contacts $y^3$, $y'$, and $y^2$ controlled by the switch $S'$. If, when the switch $S'$ closes, an overload occurs through short-circuiting the resistance $L'$, the relay O will raise its plunger and the switch $S^2$ cannot close until the current has again dropped to normal value; at which time the circuit through the winding of switch $S^2$ will be as follows:—from the positive side of the switch S, the wires 1 and 12, the winding of the switch $S^2$, the wire 18, the switch contacts $y^3$, $y'$, and $y^2$, the wire 14, the relay contacts $o^2$, $o'$, and $o^3$, the wires 15 and 19, the contact $c^2$ or $c^3$ as the case may be, the brush $m^3$ to the brush $m^2$, and the wires 10 and 11 to the negative side of the switch S. The winding of switch $S^2$ is thus energized and the switch closes, short-circuiting the resistance $L^2$ and permitting the motor to come up to full speed. If an overload occurs when the motor is running at full speed the relay will raise its plunger thus opening the circuit of the coil of switch $S^2$ at the relay contacts, causing switch $S^2$ to open and thus reinsert the resistance $L^2$ in the motor circuit. When the overload is removed the relay will drop its plunger, thus causing switch $S^2$ to again close automatically. When desirable the connections to switch $S^2$ may be so made that the switch, when closed, short-circuits both the resistance $L^2$ and the winding of the relay O (as in Fig. 2) thus rendering the relay inoperative after switch $S^2$ is closed.

While I have illustrated my invention in connection with a reversing controller of the "face-plate" type and a series wound motor, I do not wish to limit my invention to these precise forms of apparatus since controllers and motors of other types can be substituted without departing from the spirit of my invention. The relay O likewise, instead of being arranged as I have shown it with its winding in series with the motor circuit, may be arranged in other ways, the requirement being that its action be governed by the amount of current taken by the motor.

I claim—

1. In a controller for electric motors, a resistance in series with the main motor circuit, a manual controller therefor, a second resistance in series with the said main motor circuit, and means for automatically short circuiting said second resistance, said short circuiting means being operative only when substantially all of said first mentioned resistance is cut out by said manual controller.

2. In a control system, an electric motor, two resistances arranged in series in the main circuit of said motor, a manual controller having moving contacts for governing one of the resistances, and means governed both by the position of the moving contacts of said manual controller and by the current flowing through the motor for controlling said second resistance.

3. In a controller for an electric motor, a manually operated switch for reversing said motor and for controlling its acceleration up to a certain point in either direction, and automatic means for controlling the completion of the acceleration in either direction, said automatic means acting to complete the acceleration only when the manually operated switch is in the full speed position and when the current flowing through the motor is less than a predetermined value.

4. In a control system for an electric motor, a manually operated controller, a current limiting resistance in addition thereto, said current limiting resistance being in series with the main motor circuit, when the manually operated controller is in any but the full speed position, and means for short circuiting said current limiting resistance only when said manually operated controller is in its full speed position, and the current flowing through the main motor circuit is less than a predetermined value.

5. In an electric controller, a motor, a resistance in the motor circuit, means under the control of the operator for cutting out said resistance, a second resistance in the motor circuit, and means preventing the operator from cutting out the second resistance unless the current in the motor circuit is below a predetermined value.

6. In an electric controller, a motor, a resistance in the motor circuit, means under the control of the operator for cutting out said resistance, a second resistance in the motor circuit, means for automatically cutting out the second resistance, and means preventing the operator cutting out the second resistance unless the current in the motor circuit is below a predetermined value and for re-inserting the second resistance in the motor circuit when the said current rises above a predetermined value.

7. In an electric controller, a motor, a resistance in the motor circuit, a manually operated controller for governing the resistance, a second resistance in the motor circuit, a magnetically operated switch for short-circuiting the second resistance, a switch having contacts at or near the full-on position of the said controller, a second switch, and a relay controlled by the motor current and controlling the said second switch, said relay having contacts for closing the said second switch when the motor current falls below a predetermined value and for opening said second switch when the motor current rises above a predetermined value.

8. In an electric controller, a motor, a resistance in the motor circuit, a manually operated controller for governing the resistance, a second resistance in the motor circuit, a magnetically operated switch for short-circuiting the second resistance, a switch having contacts at or near the full-on position of the said controller, a second switch, and a relay controlled by the motor current and controlling the said second switch, said relay having contacts for closing the said second switch when the motor current falls below a predetermined value and for opening said second switch when the motor current rises above a predetermined value, the last two switches being in series with the winding of the said magnetically operated switch.

9. In an electric controller, a motor, a resistance in the motor circuit, a manually-operated controller governing the said resistance, an additional resistance in the motor-circuit, a magnetically-operated switch for controlling the additional resistance, and a contact at or near the full-on position of the said controller through which the closing mechanism of said magnetically-operated switch may be energized.

Signed at Cleveland, Ohio, this 7th day of May, A. D. 1908.

ARTHUR C. EASTWOOD.

Witnesses:
H. M. DIEMER,
F. R. FISHBACK.